United States Patent
Lucas et al.

(10) Patent No.: US 11,982,553 B2
(45) Date of Patent: May 14, 2024

(54) APPARATUS FOR MONITORING FLUID FLOW IN A PIPE USING ELECTROMAGNETIC VELOCITY TOMOGRAPHY

(71) Applicant: ENERCORP ENGINEERED SOLUTIONS, LLC, New Castle, DE (US)

(72) Inventors: Gary Lucas, Basingstoke (GB); Obie Ogheneochuko, Basingstoke (GB)

(73) Assignee: ENERCORP ENGINEERED SOLUTIONS, LLC, Wilmington, DE (US)

(*) Notice: Subject to any disclaimer, the term of this patent is extended or adjusted under 35 U.S.C. 154(b) by 0 days.

(21) Appl. No.: 18/550,575

(22) PCT Filed: Mar. 15, 2022

(86) PCT No.: PCT/EP2022/056753
§ 371 (c)(1),
(2) Date: Sep. 14, 2023

(87) PCT Pub. No.: WO2022/194896
PCT Pub. Date: Sep. 22, 2022

(65) Prior Publication Data
US 2024/0085228 A1    Mar. 14, 2024

(30) Foreign Application Priority Data

Mar. 16, 2021  (GB) .................... 2103627

(51) Int. Cl.
*G01F 1/58*  (2006.01)
*G01F 1/002*  (2022.01)
(Continued)

(52) U.S. Cl.
CPC .............. *G01F 1/588* (2013.01); *G01F 1/584* (2013.01); *G01F 1/586* (2013.01); *G01F 1/60* (2013.01); *G01F 1/74* (2013.01); *G01F 1/002* (2013.01)

(58) Field of Classification Search
CPC .......... G01F 1/588; G01F 1/584; G01F 1/586; G01F 1/60; G01F 1/74; G01F 1/002
See application file for complete search history.

(56) References Cited

U.S. PATENT DOCUMENTS 4,308,752 A   1/1982 Appel et al.
9,163,967 B2  10/2015 Lucas
(Continued)

FOREIGN PATENT DOCUMENTS

EP    0326266 B1   10/1992
GB    2527324 A    12/2015
(Continued)

OTHER PUBLICATIONS

International Search Report and Written Opinion in related international application PCT/EP2022/056753 dated Jun. 27, 2022.
(Continued)

*Primary Examiner* — Peter J Macchiarolo
*Assistant Examiner* — John M Royston
(74) *Attorney, Agent, or Firm* — MH2 TECHNOLOGY LAW GROUP, LLP

(57) ABSTRACT

An apparatus for monitoring a fluid flow in a pipe using electromagnetic velocity tomography (EVT) which can incorporate capacitively-coupled electrodes which avoid any direct physical and electrical contact between the process fluid to be monitored and the electronics for processing the flow induced voltages, yet which can provide highly (Continued)

accurate output data for processing using electromagnetic velocity tomography (EVT) to produce images of the fluid flow.

30 Claims, 7 Drawing Sheets

(51) Int. Cl.
  *G01F 1/60* (2006.01)
  *G01F 1/74* (2006.01)

(56) References Cited

U.S. PATENT DOCUMENTS

2013/0144548 A1* 6/2013 Xie ................... G01N 33/2823
  702/65
2017/0261357 A1* 9/2017 Wang ....................... F17D 3/10

FOREIGN PATENT DOCUMENTS

| JP | H05 66138 A | 3/1993 |
| JP | H05 72008 A | 3/1993 |
| JP | 2018 080966 A | 5/2018 |

OTHER PUBLICATIONS

Search Report Under Section 17 in related GB Application 2103627.2 dated Jan. 13, 2022.

* cited by examiner

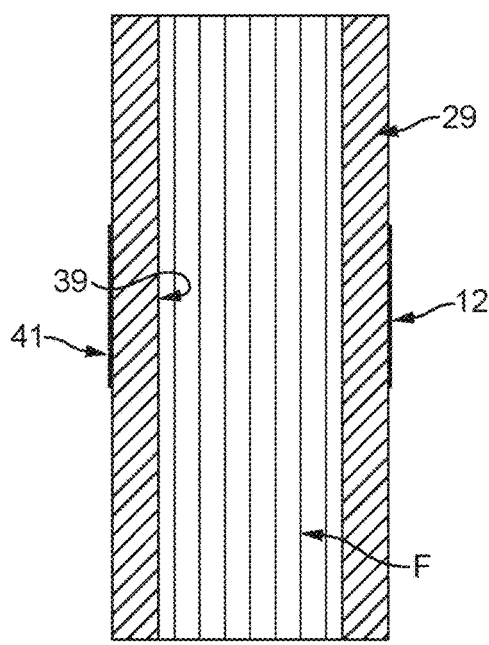
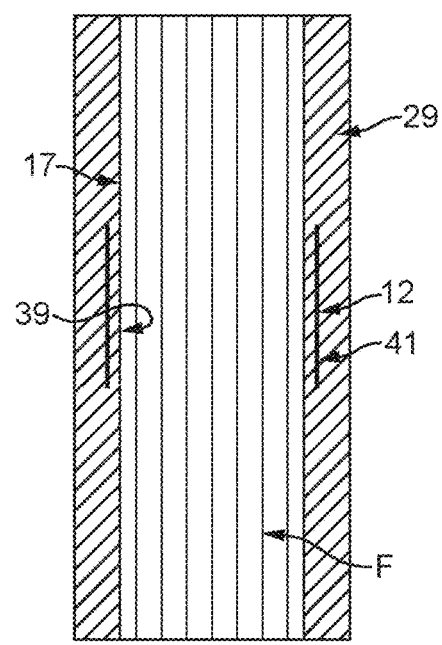
FIG. 4
FIG. 5
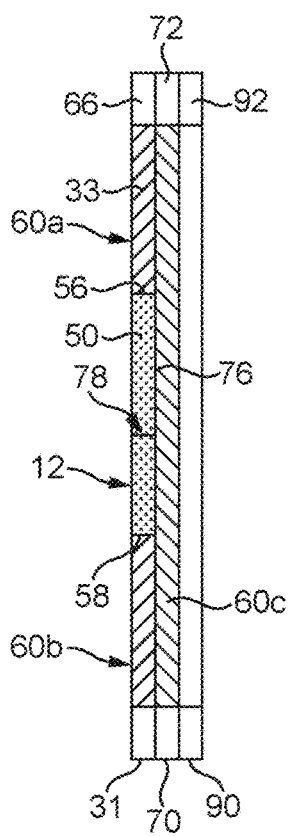
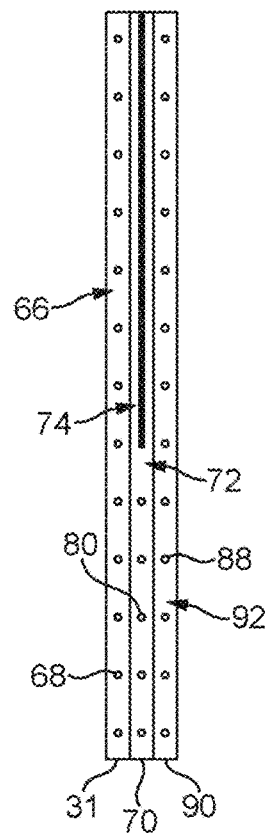
FIG. 6
FIG. 7

APPARATUS FOR MONITORING FLUID FLOW IN A PIPE USING ELECTROMAGNETIC VELOCITY TOMOGRAPHY

FIELD OF THE INVENTION

The present invention relates to apparatus for monitoring fluid flow in a pipe using electromagnetic velocity tomography (EVT). The apparatus generates a magnetic field within a pipe and when electrically conducting fluid, such as an aqueous phase, flowing along the pipe passes through the magnetic field, flow induced voltages are generated by magnetic induction which are detected by electrodes. The flow induced voltages generated at the inner surface of the annular wall of the pipe are detected by the electrodes. The signals at the electrodes can be processed to produce images of the flow velocity profile in the pipe. The flow may be a multiphase flow which comprises fluids, and may comprise a mixture of liquids, or one or more liquids in a mixture with solids and/or gases. This invention may provide a multiphase flow metering apparatus which has a number of applications, in particular within the oil and gas exploration and production industry.

BACKGROUND

It is known to provide an apparatus for monitoring a fluid flow in a pipe using electromagnetic velocity tomography (EVT), the apparatus comprising a pipe defining a flow conduit. The term "flow conduit" refers to the void surrounded by the pipe. A coil system comprising electrically conductive wires is located externally of the flow conduit for generating composite magnetic fields within the flow conduit. A magnetic signal driving circuitry is electrically connected to the coil system, and is arranged to pass electrical current through the coil system thereby to transmit a magnetic field from the coil system into the flow conduit.

A plurality of measurement electrodes are located around the flow conduit for detecting voltages induced in an electrically conducting fluid flowing through the magnetic field. A signal processing circuitry is electrically connected to the plurality of measurement electrodes for receiving flow induced voltage signals from the electrodes. These voltage signals are processed to calculate the flow velocity profile in the pipe.

In such known apparatus, typically one of the measurement electrodes is taken as a reference electrode. One of the measurement electrodes may be selected as the constant reference electrode, but alternatively the selection of a reference electrode may vary sequentially among the measurement electrodes so that individual measurement electrodes are utilized, in turn, as the reference electrode. In use, the voltages at the electrodes, which are generated as a result of electromagnetically induction between the magnetic field and the fluid, are measured, with respect to the voltage at the set reference electrode, to provide flow induced voltage signals In known apparatus for monitoring fluid flow in a pipe using electromagnetic velocity tomography (EVT), the electrodes are exposed at the inner surface of the of the pipe and are in direct contact with the fluid within the flow conduit. However, such direct contact means that the exposed surface of the electrode can become eroded, worn, corroded, damaged or soiled during use. The material used for the electrode must be compatible with the fluids to which the electrodes may be exposed during use. The exposed electrode may also cause a large direct current offset voltage to be generated as a result of electrochemical interactions between the electrode and the electrically conductive fluid. Also, the assembly of the electrodes at the inner surface of the pipe must provide a leak-free seal which is able to withstand high fluid pressures during use, for example up to 200 bar.

Moreover, in an apparatus in which the electrodes are embedded in the pipe wall, electrical connectors between the electrodes and driving/measuring circuitry need to extend through holes drilled partially through the pipe wall, which may compromise the structural integrity of the pipe wall.

In order to overcome these problems, it has been proposed to provide non-contacting electrodes which do not contact the flowing fluid and which are capacitively-coupled to the fluid in order to detect flow induced voltages in the fluid flow. A number of flowmeters comprising non-contacting capacitively-coupled electrodes are known, as exemplified below.

U.S. Pat. No. 3,999,443 discloses an electromagnetic flowmeter with shielded electrodes in which a pair of electrodes are embedded within a dielectrically-lined flow tube on opposite sides of the flow tube, and an embedded driven shield is located behind each of the electrodes. U.S. Pat. No. 4,513,624 discloses a capacitively-coupled magnetic flowmeter in which a pair of electrodes are embedded within a flow tube on opposite sides of the flow tube, and an on-line measure of the electrode capacitance that is non-interactive with the flow induced current signal is made which foregoes the need for shields located around the electrodes. U.S. Pat. No. 4,953,408 discloses a capacitive type electromagnetic flowmeter in which a pair of electrodes are embedded within a flow tube on opposite sides of the flow tube. US-A-2010/0071476 discloses a capacitively-coupled magnetic flowmeter in which a pair of signal electrodes are embedded within a flow tube on opposite sides of the flow tube, each signal electrode having an embedded guard electrode rearwardly thereof, and a signal pick-up circuit having increased impedance is connected to the signal electrodes.

Although these prior publications disclose the use of capacitively-coupled electrodes in flowmeters, which measure the flow rate of the electrically conductive fluid, nevertheless these documents do not disclose apparatus configured for electromagnetic velocity tomography (EVT) in which the signals at the electrodes can be processed to produce images of the flow velocity profile in the pipe, particularly when the flow is a multiphase flow which comprises fluids, and may comprise a mixture of liquids, or one or more liquids in a mixture with solids and/or gases.

There prior publications do not disclose electrode structures which enable the achievement of flow induced voltages by capacitive-coupling which are of sufficient accuracy to enable subsequent processing to provide accurate electromagnetic velocity tomography (EVT) images, preferably in real-time.

SUMMARY OF THE INVENTION

The present invention aims to overcome the limitations described above, associated with the use of capacitively-coupled electrodes in flowmeters, which restrict or prevent their use in electromagnetic velocity tomography (EVT) applications.

The present invention aims, at least partially, to meet this need in the art, particularly in the field of oil and gas exploration and production, to provide an apparatus which can monitor a fluid flow in a pipe using electromagnetic velocity tomography (EVT) to provide enhanced analytical data, preferably in real-time, on the velocity distribution within the conducting continuous phase of multiphase fluid/solid flows, particularly within a pipeline used in the oil and gas industry.

The present invention aims to provide an apparatus for monitoring a fluid flow in a pipe using electromagnetic velocity tomography (EVT) which can incorporate capacitively-coupled electrodes which avoid any direct physical and electrical contact between the process fluid to be monitored and the electronics for processing the flow induced voltages, yet which can provide highly accurate output data for processing using electromagnetic velocity tomography (EVT) to produce images of the fluid flow.

The present invention aims to provide an apparatus for monitoring a fluid flow in a pipe using electromagnetic velocity tomography (EVT) which is easier to manufacture than known EVT apparatus for monitoring a fluid flow in a pipe in which directly contacting electrodes are utilized to contact the fluid flow, but also have a longer, more reliable and safer service life as a result of the avoidance of direct physical and electrical contact between the electrodes and electromagnetic velocity tomography (EVT) electronics and the process fluid, and direct physical contact between the electrodes and the process fluid flow.

The present invention accordingly provides an apparatus according to claim 1 for monitoring a fluid flow in a pipe using electromagnetic velocity tomography (EVT).

The preferred embodiments of the present invention can provide an apparatus for monitoring a fluid flow in a pipe using electromagnetic velocity tomography (EVT) which can overcome a number of drawbacks of a known contact electrode EVT apparatus namely: (i) a small electrode contact surface area, (ii) fouling/eroding/corroding of the electrode contact surface, (iii) a need for a careful selection of the electrode material with respect to the process fluid, (iv) the presence of large dc offset due to an electrochemical effect between the electrode and the fluid, (v) a difficultly in ensuring a 'leak free' seal between the electrode and the pipe wall at very high operating pressure, and (vi) a stringent safety requirement when used in a hazardous environment. These problems in known apparatus are easily overcome by using a capacitive sensing technique for the electromagnetic velocity tomography (EVT) apparatus.

In contrast, the preferred embodiments of the present invention can provide an apparatus for monitoring a fluid flow in a pipe using electromagnetic velocity tomography (EVT) in which the electrode surface area can be maximised to increase the signal strength of the detected flow induced voltages. Also, since the electrodes are not in contact with the process fluid there is no fouling, corrosion or erosion of the electrode by the process fluid and any suitable electrically conductive material, preferably having a high electrical conductivity, can be employed, without the material requiring high wear resistance. Since the electrodes are not in electrical contact with the process fluid, there is no electrochemical effect and no associated large dc offset, and the apparatus can be more safely used in a hazardous environment. The internal surface of the pipe can have a continuous, uninterrupted surface and there is no need to provide a 'leak free' seal between the electrodes and the pipe wall. Moreover, there is no requirement for the electrodes to be embedded in the pipe wall, and therefore electrical connectors between the electrodes and driving/measuring circuitry do not need to extend through holes drilled partially through the pipe wall, which can enhance the structural integrity of the pipe wall as compared to the use of fluid-contacting electrodes. The preferred embodiments of the present invention can provide a plurality of measurement electrodes comprised in a flexible printed circuit board which is positioned circumferentially around the pipe, and can be dimensioned to provide any desired number of measurement electrodes around the pipe, which also can be of any desired internal diameter.

In the preferred embodiments of the present invention, the coil system incorporates a cosine coil configuration which is capable of generating uniform and non-uniform magnetic fields which are required for Electromagnetic Velocity Tomography (EVT). The cosine coil system can easily be scaled to accommodate flow pipes having a wide range of internal diameters.

BRIEF DESCRIPTION OF THE DRAWINGS

Embodiments of the present invention will now be described, by way of example only, with reference to the accompanying drawings, in which:

FIG. 4 is a schematic cross-section through the pipe in the apparatus of FIG. 1 in which measurement electrodes are positioned around an external circumferential surface of the pipe;

FIG. 5 is a schematic cross-section through the pipe in the apparatus of FIG. 1 according to another embodiment of the present invention in which measurement electrodes are embedded within an annular wall of the pipe;

FIGS. 6 and 7 are schematic cross-sections, along lines A-A and B-B of FIG. 8 respectively, through the flexible printed circuit board in the apparatus of FIG. 1;

DETAILED DESCRIPTION

Figure 1:
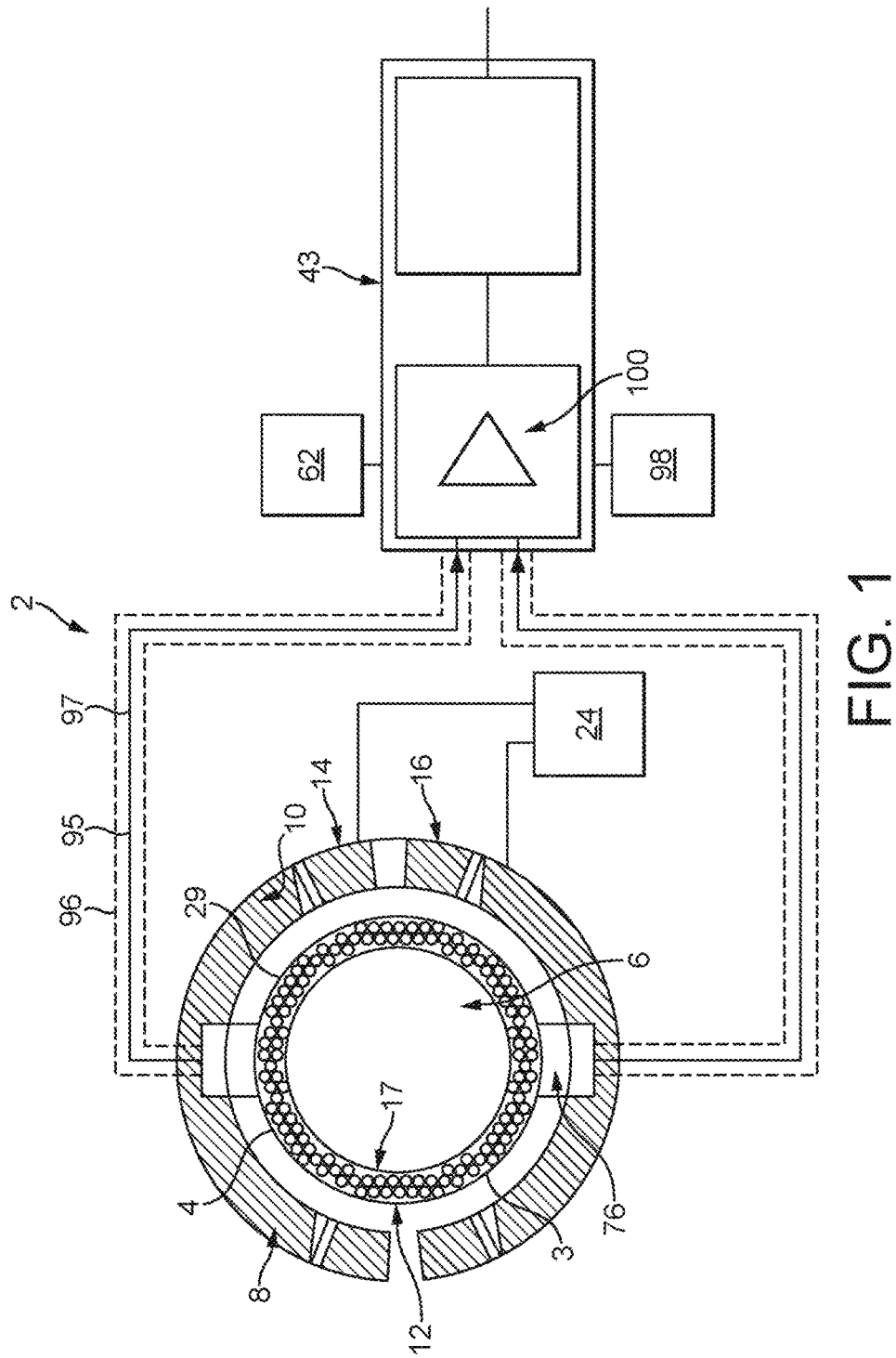
FIG. 1 is a schematic illustration of an apparatus for monitoring a fluid flow in a pipe, the pipe being illustrated in a schematic cross-sectional end view, using electromagnetic velocity tomography (EVT) in accordance with a first embodiment of the present invention.

Referring to FIG. 1, there is shown an apparatus 2 for monitoring a fluid flow in a pipe using electromagnetic velocity tomography (EVT) in accordance with an embodiment of the present invention. In the illustrated embodiments of the present invention, the apparatus 2 is arranged to measure the velocity profile of a single phase flow of an electrically conducting fluid in the pipe or is arranged to measure the velocity profile of a continuous electrically conducting phase of a multiphase fluid flow in the pipe.

In this specification, the term "pipe" is to be construed broadly and means any tubular body, or tube, defining a flow conduit of any shape and size and the tubular body may be composed of any material or combination of materials, including electrically non-conducting materials, compatible with the use of electromagnetic velocity tomography (EVT) in which magnetic fields are transmitted into the flow conduit and the detection of voltages induced in the electrically conducting fluid in the flow conduit. Preferably, the material of the pipe is electrically non-conducting and has low or no magnetic permeability, at least in the region of the pipe which is exposed to magnetic fields during the electromagnetic velocity tomography (EVT) measurement. Furthermore, in this specification, the term "annular" is to be construed broadly to encompass a variety of different ring-like shapes and encompasses shapes which are circular, elliptical, polygonal, etc.

In use, the electrically conducting fluid is typically an aqueous phase, which is present in either a single phase or present in a multiphase fluid. When used in the field of oil and gas exploration and production, such a multiphase flow comprises, in addition to an aqueous phase, at least one phase, optionally at least two phases, further optionally all of the phases, selected from an oil phase, a solid phase and a gaseous phase. The multiphase flow typically has a primary or continuous phase of the flow, which is an electrically conductive aqueous phase comprising water, and within the primary phase one or more other phase constituents may be present, for example a solid phase, e.g. sand, and/or an oil phase and/or a gas phase. The flow regime of these phases can vary significantly depending on the concentrations of each phase and the flow rate.

The apparatus 2 comprises a pipe 4 defining a flow conduit 6 along which, in use, fluid flows, and the fluid flow is to be monitored using electromagnetic velocity tomography (EVT) as described hereinbelow.

Figure 2:
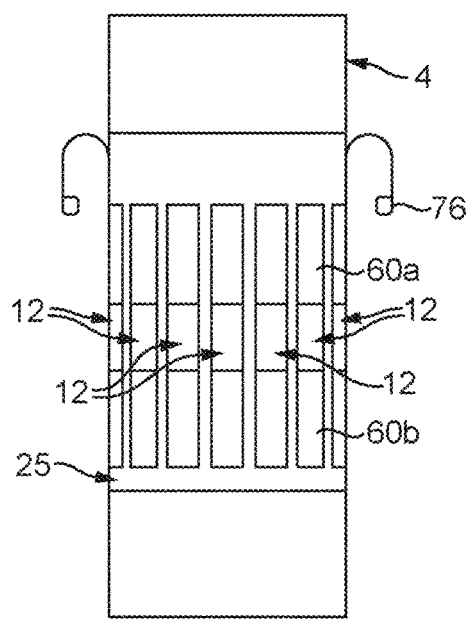
FIG. 2 is a schematic side view of the pipe, and an associated flexible printed circuit board positioned therearound, of the apparatus of FIG. 1.
Figure 3:
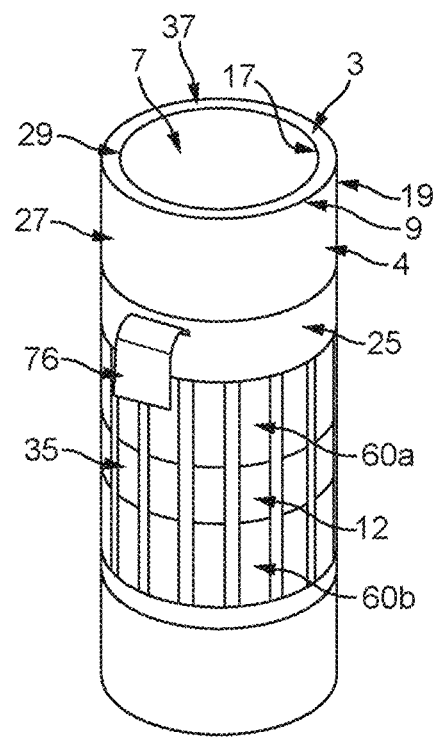
FIG. 3 is a schematic perspective view of the pipe, and an associated flexible printed circuit board positioned therearound, of the apparatus of FIG. 1.

Referring to FIGS. 2 and 3, the pipe 4 comprises a tubular body 3 which is comprised of an electrically non-conductive and non-magnetic material, for example a thermoplastic polymer, such as polypropylene or fibreglass. The pipe 4 may consist of a single electrically non-conductive material forming the annular wall 29 of the pipe 4. Alternatively, the longitudinal section of the pipe 4 shown in FIG. 1 around which the fluid flow is to be monitored is comprised of the electrically non-conductive material, and the longitudinal section is fitted between other pipe sections made of any other suitable material, which may be electrically conductive material, but does not have magnetic properties which would interfere with the imposed magnetic field, for example aluminum.

In a preferred embodiment as shown in FIGS. 1 and 3, a tubular inner liner 17 is affixed to an inner tubular surface 7 of the tubular body 3, and/or a tubular outer liner 19 is affixed to an outer tubular surface 9 of the tubular body 3. The inner liner 17 can be used to embed the electrode 12 within the pipe wall 29 and provide a relatively short distance between the electrode 12 and the fluid flow, yet physically and electrically separating the electrode 12 from the fluid in the conduit 6. Reducing the distance between the electrode 12 and the fluid correspondingly reduces the capacitive impedance therebetween.

The apparatus 2 further comprises a coil system 8 comprising electrically conductive wires 10 (shown highly schematically in FIG. 1 and not in any particular orientation or direction) located externally of the flow conduit 6 for generating composite magnetic fields within the flow conduit 6.

The coil system 8 comprises first and second coils 14, 16 on respective opposite sides of the pipe 4. Each of the first and second coils 14, 16 comprises a respective plurality of sub-coils in series within the respective coil 14, 16. The first and second coils 14, 16 preferably have a nested saddle-shaped structure.

In the illustrated embodiment, each coil 14, 16 is electrically connected to magnetic signal driving circuitry 24 (illustrated highly schematically in FIG. 1) arranged to pass electrical current through the coils 14, 16 thereby to transmit a magnetic field from the coils 14, 16 into the flow conduit 6.

When viewed in cross-section, the windings of the first (upper) and second (lower) coils 14, 16 of the coil system form an array of discrete batches of electroconductive wires. In the preferred embodiment, the coil system 8 is a cosine coil system in which the geometrical centre of the $k^{th}$ wire batch subtends an angle $\theta_k$, and each $k^{th}$ wire batch comprises $N_k$ wires and $N_k$ is proportional to $|\cos \theta_k|$.

The magnetic signal driving circuitry 24 is typically arranged or configured to pass electrical current (i) in a first operational mode through both of the first and second coils 14, 16 so that, when the apparatus shown in FIG. 1 is viewed in plan from above, in each of the first and second coils 14, 16 the electrical current is in the same rotational direction to generate a uniform magnetic field in the flow conduit 6 in the first operational mode and (ii) in a second operational mode through both of the first and second coils 14, 16 so that, when the apparatus shown in FIG. 1 is viewed in plan from above, in the first and second coils 14, 16 the electrical current is in respective opposite rotational directions to generate a non-uniform magnetic field in the flow conduit 6 in the second operational mode.

The magnetic signal driving circuitry 24 is configured selectively to drive the first and second coils 14, 16 in either of the first and second operational modes.

In addition, the apparatus 2 comprises a plurality of measurement electrodes 12 located around the flow conduit 6 for detecting voltages induced in an electrically conducting fluid flowing along the pipe 4 and through the magnetic field. The measurement electrodes 12 in the apparatus of the present invention are capacitively-coupled non-contacting electrodes, which in use are capacitively coupled to, and do not physically or electrically contact, the electrically conducting fluid.

As shown in FIGS. 2 and 3, the plurality of measurement electrodes 12 is comprised in a flexible printed circuit board 25 which is positioned circumferentially around the pipe 4. In the illustrated embodiment, the flexible printed circuit board 25 is wrapped around an outer circumferential surface 27 of the annular wall 29 of the pipe 4. As shown in FIG. 4, this provides measurement electrodes 12 located around the external circumferential surface of the pipe 4.

In an alternative embodiment as illustrated in FIG. 5, the flexible printed circuit board 25 is embedded within the annular wall 29 of the pipe 4, which provides measurement electrodes 12 located circumferentially within the wall 29 of the pipe 4.

The measurement electrodes 12 are composed of a metal layer, preferably a copper layer, in the flexible printed circuit board 25.

In the illustrated embodiment, the flexible printed circuit board 25 includes the plurality of measurement electrodes 12 for the EVT apparatus and since the measurement electrodes 12 utilize capacitive sensing of very small flow induced voltages the flexible printed circuit board 25 comprises a multilaminar structure which is configured to provide effective signal guarding for the measurement electrodes 12.

Stray capacitances exist between each measurement electrode 12 and other surfaces within the EVT apparatus which are at different potentials (e.g. ground potential). For electromagnetic flow metering devices employing capacitively coupled electrodes, and which use temporally varying magnetic fields, these stray capacitances provide low impedance paths (e.g. to ground) which can considerably degrade the voltage output which is subsequently measured and processed to provide EVT data. The multilaminar structure of the flexible printed circuit board 25 minimises such stray capacitances.

Referring to FIGS. 6 to 10, the printed circuit board 25 comprises a first lamina 31. The first lamina 31 comprises an electrically conductive layer 33 which is patterned to form an annular serial array 35 of mutually spaced measurement electrodes 12 around the pipe 4 which are separated from the flow conduit 6 by at least a portion 37 of a thickness of the pipe 4, as shown in FIG. 3.

In the illustrated embodiment, as shown in FIG. 1, the annular serial array 35 of mutually spaced measurement electrodes 12 comprises sixteen equidistantly spaced measurement electrodes 12; with sixteen electrodes the geometric centres of the adjacent measurement electrodes 12 are separated by an angle of 22.5°.

Preferably, the first lamina 31 is a lower layer of the printed circuit board 25 and, as shown in FIG. 4, is adjacent to an outer circumferential surface 27 of the pipe 4. Alternatively, as shown in FIG. 5 the printed circuit board 25 may be embedded within the pipe 4. As described above, the pipe 4 is comprised of an electrically non-conductive material, and the electrically non-conductive material is positioned between the measurement electrodes 12 and the inner circumferential surface 7 of the pipe 4. Accordingly, when, in use, an electrically conductive fluid, represented by parallel flow lines F in FIGS. 4 and 5, is present in the flow conduit 6, each measurement electrode 12 and a respective areal portion 39 of the pipe 4 thereunder, form, together with the electrically conductive fluid, a respective sensor 41 which is capacitively coupled to a portion of the electrically conductive fluid in the fluid conduit 6.

In use, the measurement electrode 12 and the electrically conductive fluid form opposite electrically conductive components of a capacitor having a layer of dielectric material, provided by the annular wall 29 of the pipe 4, therebetween. The capacitor formed is a parallel plate capacitor comprising the electrode (conductor #1)/the electrically non-conductive pipe wall (dielectric)/the electrically conductive process fluid (conductor #2).

The pipe wall capacitance so formed can be modelled using the parallel plate capacitor theory. The capacitance $C_w$ is dependent on (i) the pipe wall thickness d; (ii) electrode cross-sectional area A; and (iii) the relative dielectric permittivity $\varepsilon_r$ of the pipe wall between the non-contact electrode and the conductive fluid as given by equation (1) below.

$$C_w = \frac{\varepsilon_0 \varepsilon_r A}{d} \quad (1)$$

where $\varepsilon_0$ is vacuum permittivity. Note that the capacitance $C_w$ can vary slowly with temperature because of changes in $\varepsilon_r$ and A with temperature. Following from Faraday's law, a flow induced voltage generated at the pipe wall boundary by an alternating B-field acting orthogonal to a flowing conductive fluid in the pipe be defined by $$v(t) = V \cos \omega t \quad (2)$$

where $\omega$ is the angular frequency of the alternating voltage signal and V is the peak amplitude of the flow induced voltage at the relevant angular position at the inner pipe circumference. The flow induced voltage generated on one plate of the capacitor (formed by the conductive fluid/non-conductive pipe wall electrode arrangement) at the relevant angular position on the inner pipe circumference creates an electric field, which in turn, would cause an alternating current i(t) to flow through the parallel plate capacitor. This current is given by $$i(t) = -\omega C_w V \sin \omega t \quad (3)$$

Figure 11:
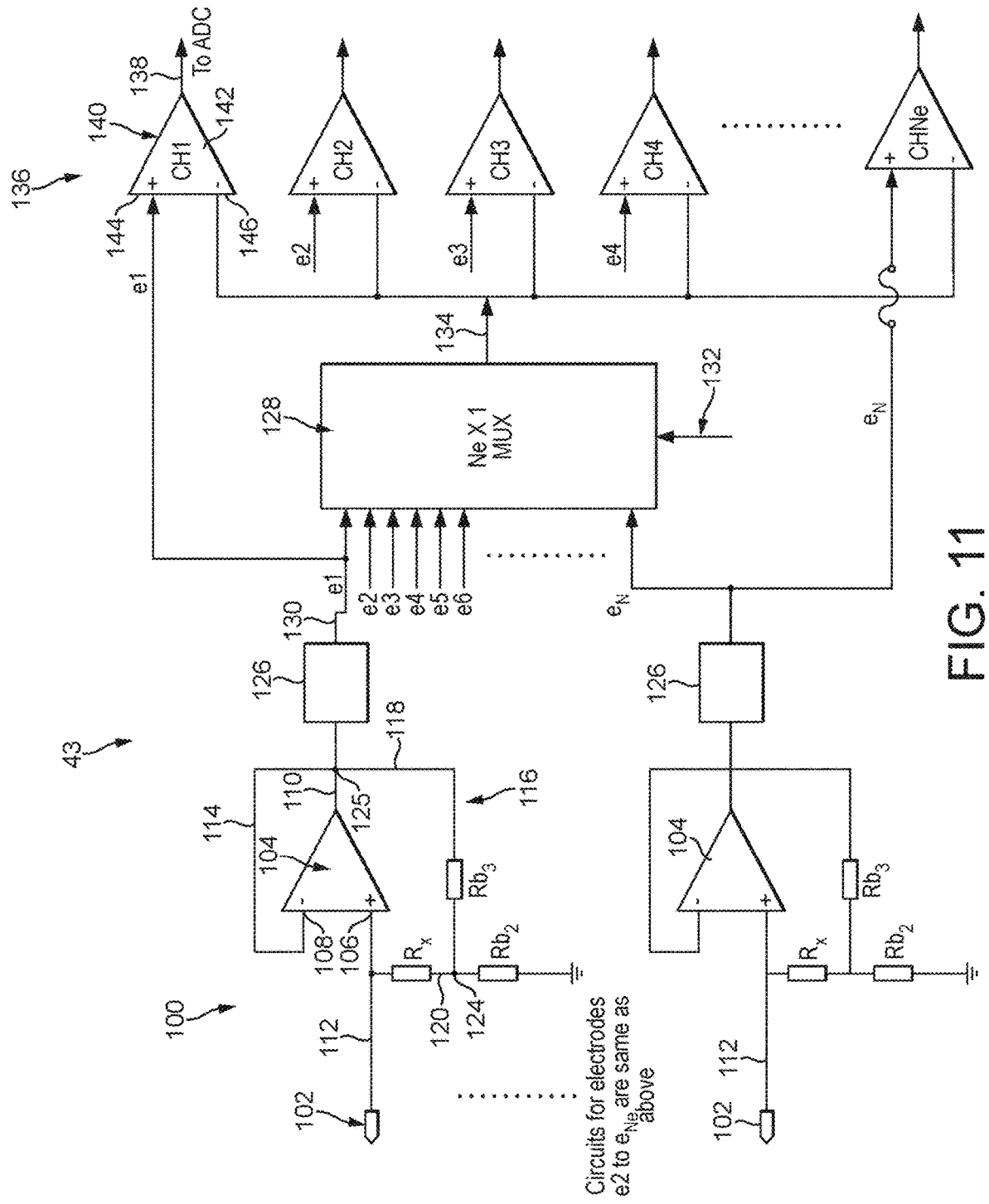
FIG. 11 is a schematic illustration of the signal processing circuitry of the apparatus of FIG. 1.

Referring to FIG. 1, and also to FIG. 11, a signal processing circuitry 43 is electrically connected to the plurality of measurement electrodes 12 for receiving flow induced voltage signals from the electrodes 12.

The signal processing circuitry 43 is configured to be capable of providing accurate measurement of either (i) the flow induced voltages appearing at the wall of the flow conduit, adjacent to the relevant non-contact electrodes as defined in equation (2) or (ii) the current/charge flowing through the non-contact electrodes as defined in equation (3).

The amplitude of the flow induced voltages obtained from an EVT apparatus are typically very small, typically in the microvolt range μV, compared to the amplitude of noise signals that are parasitically coupled to the EVT apparatus. It is therefore important that the signal processing circuitry 43 is capable of effectively rejecting noise signals while being able to amplify the useful flow induced signals. Furthermore, the measured voltages generated by the flow hydrodynamics should not be affected by the signal processing circuitry 43.

The signal processing circuitry 43, comprising an electronics interface circuit, is configured to avoid or overcome problems with noise sources such as (i) eddy current induced noise; (ii) an electrical mains supply interference noise, typically at 50 Hz or 60 Hz in some countries, and its harmonics; (iii) high frequency interference signals from pumps, electric motors, switch mode devices etc.; (iv) quadrature noise; and (v) input referred voltage noise of the amplifier, the input current noise and the current noise contribution from the 4 kTR thermal noise for a resistive device. Eddy current noise can also be reduced by the use of insulating tracks cut into the electrodes and guard electrodes, as described below.

The pipe wall capacitance $C_w$ of a non-contact EVT apparatus estimated using equation (1) is typically between 0.1-30 pF depending on factors such as the electrode area A, pipe wall dielectric constant εr, and pipe wall thickness d.

The pipe wall impedance is similarly estimated to be in the giga-ohms range ($10^9 \Omega$) for the frequencies $f_1$ and $f_2$ typically used in an EVT apparatus. This represents a very high impedance measurement source and is subject to measurement errors such as loading error from the source impedance, the input circuit bias current of the measurement circuit, as well as from parasitic shunt impedances including that of a signal cable.

The parasitic resistance $R_p$ and capacitance $C_p$ of a signal cable are known to act as an antenna for noise pickup into the electronics interface circuit, which consequently couples onto the flow induced signal by means of capacitive and inductive coupling.

The parasitic resistance $R_p$ and capacitance $C_p$ inherent in a signal cable can form a voltage divider network with the coupling capacitance (pipe wall impedance) $C_w$ and the input impedance of the signal processing circuitry. For the purpose of illustration, if the EVT flow induced voltage $V_\phi$ generated at the inner pipe wall boundary is taken as a voltage source connected to the input of an electronics interface circuit via the pipe wall capacitance $C_w$, the voltage $V_{in}$ appearing at the input of the electronics interface circuit is given by $$V_{in} = \left\{ \frac{Z_w Z_{tot}}{Z_w + Z_{tot}} \right\} V_\phi \qquad (4)$$

where $V_\phi$ is the flow induced voltage at the inner pipe wall boundary of the non-contact electrode and $Z_{tot}$ is defined as $$Z_{tot} = \frac{Z_{in} Z_p}{Z_{in} + Z_p} \qquad (5)$$

where $Z_{in}$ is the effective input impedance of the voltage follower circuit and $Z_p$ is the shunt parasitic impedance of the signal cable connecting the electronics interface circuit to the non-contact electrode.

It is apparent from equations (4) and (5) that for yin to be as close as possible to $V_\phi$, then the condition $Z_p >> Z_{in}$ must be satisfied. One technique that can be used to ensure $Z_p >> Z_{in}$ is by actively driving the guard of the signal cable at same potential as the EVT flow induced voltage $V_\phi$.

Given the high pipe wall impedance and low amplitudes of the flow induced voltage signals in the non-contact EVT apparatus, the front-end of the electronics interface circuit is configured to minimize possible measurement errors.

Equation (4) shows that by minimizing the pipe wall impedance $Z_w$ and maximizing the input impedance $Z_{im}$ of the electronics interface circuit and the parasitic impedances $Z_p$ of the signal cable, the flow induced voltages generated at the inner pipe wall boundary can be measured with an enhanced accuracy.

The preferred embodiment of the present invention accordingly provides a bootstrapped buffer circuit with a unity gain, very low input bias current and input current noise which can be used to maximize the input impedance of the electronics interface circuit used in a non-contact electrode EVT apparatus. The bootstrapped buffer circuit can be designed to satisfy the ultra-high input impedance and low input bias current requirement of the electronics interface circuit used for a non-contact EVT apparatus.

Examples of amplifiers with an ultra-high input impedance and low input bias current that can be used for the design of the front-end circuit include the commercially available amplifiers INA116 (Texas Instruments), LMC6001 (National Semiconductor), LMP7721 (Texas Instruments) and ADA4530-1 (Analog Devices).

Equation (1) shows that the distance d between the electrode and the process fluid is inversely related to the pipe wall capacitance $C_w$. Hence, the pipe wall impedance $Z_w$ can be reduced (by increasing the pipe wall capacitance $C_w$) by embedding the electrode in the pipe wall so as to reduce the distance d between the electrode and the process fluid.

Additionally or alternatively, the pipe wall impedance $Z_w$ can be reduced by adding a non-conductive pipe wall liner with a high relative permittivity on either or both the inner and outer pipe wall surface, as described above with reference to FIG. 4.

Additionally or alternatively, the non-contact EVT electrode may be wrapped over the liner such that the separation distance between the process fluid and the electrode is defined by the liner thickness.

Furthermore, the signal cable parasitic impedance can be maximized using actively driven signal cable guards which are driven at the EVT flow induced potential of the associated electrodes.

The techniques described above are aimed at effectively minimizing the pipe wall impedance $Z_w$ in a non-contact EVT apparatus.

The structural arrangement of the printed circuit board 25 comprising the measurement electrodes 12 will now be described in detail, referring to FIGS. 6 to 10.

Each measurement electrode 12 comprises a respective area 50 of the electrically conductive layer 33. Each measurement electrode 12 is typically rectangular in plan. Each measurement electrode 12 has opposite first and second end edges 56, 58 which are separated in a longitudinal direction which is parallel to a flow direction of the flow conduit 6. Each measurement electrode 12 also has opposite first and second side edges 52, 54 which are separated in a transverse direction which is orthogonal to the flow direction of the flow conduit 6. Since the flexible printed circuit board 25 is wrapped around the pipe 4, typically each measurement electrode 12 is also arcuate in cross-section.

In the illustrated embodiment, the electrically conductive layer 33 of the printed circuit board 25 is further patterned to form a plurality of guard electrodes 60. Each electrode 12 is positioned between a respective pair of guard electrodes 60a, 60b. Each guard electrode 60a, 60b of the pair is positioned adjacent to, but electrically separated from, a respective first or second end edge 56, 58 of the respective measurement electrode 12. Each guard electrode 60 is typically rectangular in plan. Since the flexible printed circuit board 25 is wrapped around the pipe 4, typically each guard electrode 60 is also arcuate in cross-section.

The guard electrodes 60 are electrically connected to a guard voltage supply system 62 for applying a guard voltage to the guard electrodes 60. The guard electrodes 60 function to minimize the effects of any stray capacitances, particularly when the guard electrodes 60 are driven at a potential which always closely matches the temporally varying flow induced potential on the adjacent measurement electrode 12.

The measurement electrodes 12, in combination with the respective pair of guard electrodes 60 on opposite sides thereof, are separated by separation areas 64 of the first lamina 31. The separation areas 64 comprise a first layer 66 of electrically insulating material adjacent to the electrically conductive layer 33. A first array of electrically conductive vias 68 (shown highly schematically by dots representing the vias in FIG. 7) is provided in the first layer 66 of electrically insulating material for electrically connecting the separation areas 64 to a reference potential, for example a ground potential (GND). By connecting the regions between the sequential electrode areas on the printed circuit board 25 to a reference potential, preferably by being earthed at a ground potential, any capacitance between adjacent measurement electrodes 12 is minimized.

In the illustrated embodiment, the first array of electrically conductive vias 68 are parallel and mutually spaced, and extend uniformly over the first layer 66 of electrically insulating material.

Figure 8:
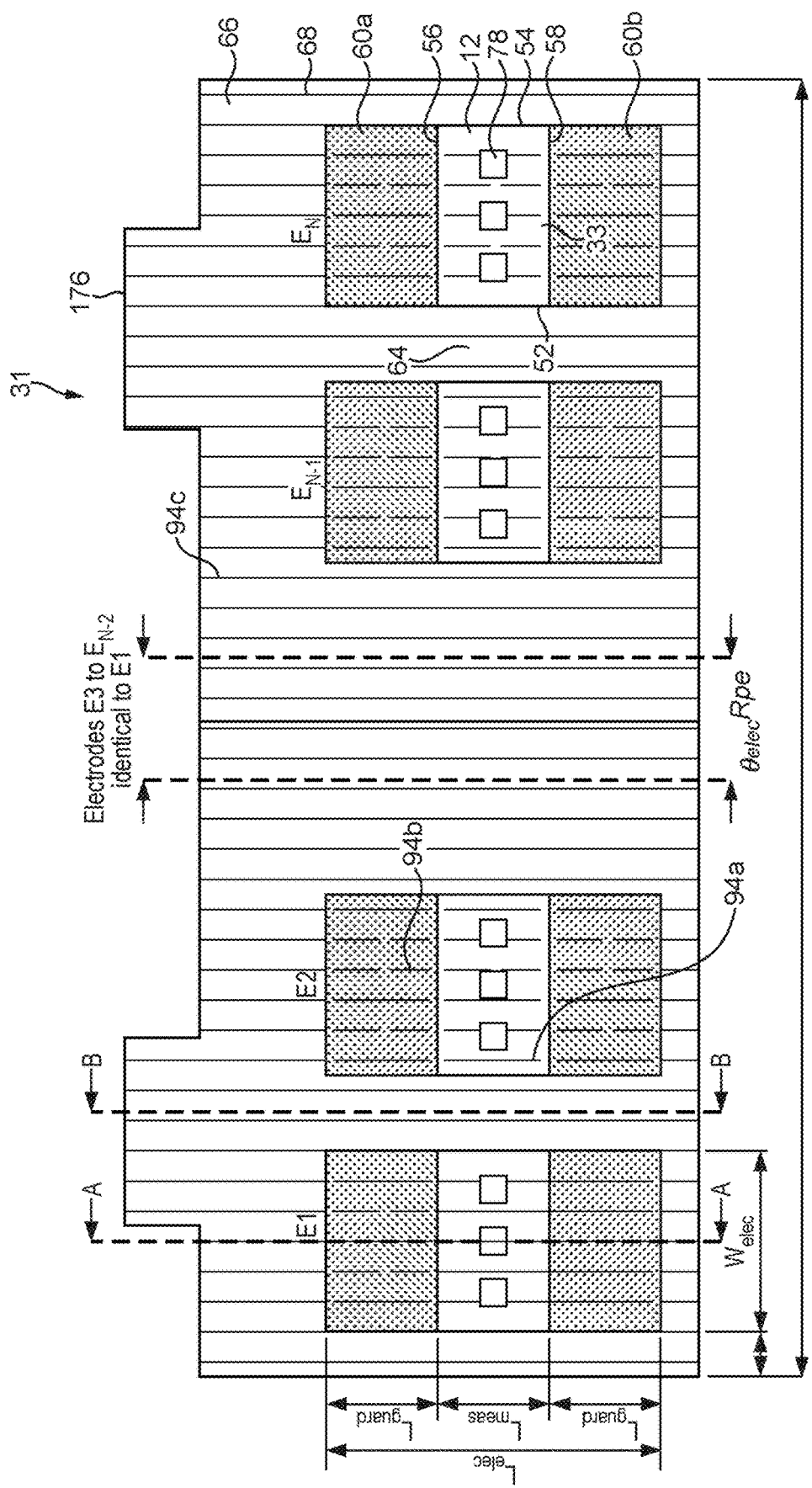
FIGS. 8, 9 and 10 are schematic plan views of, respectively, the bottom, middle and top layers of the flexible printed circuit board in the apparatus of FIG. 1.
Figure 9:
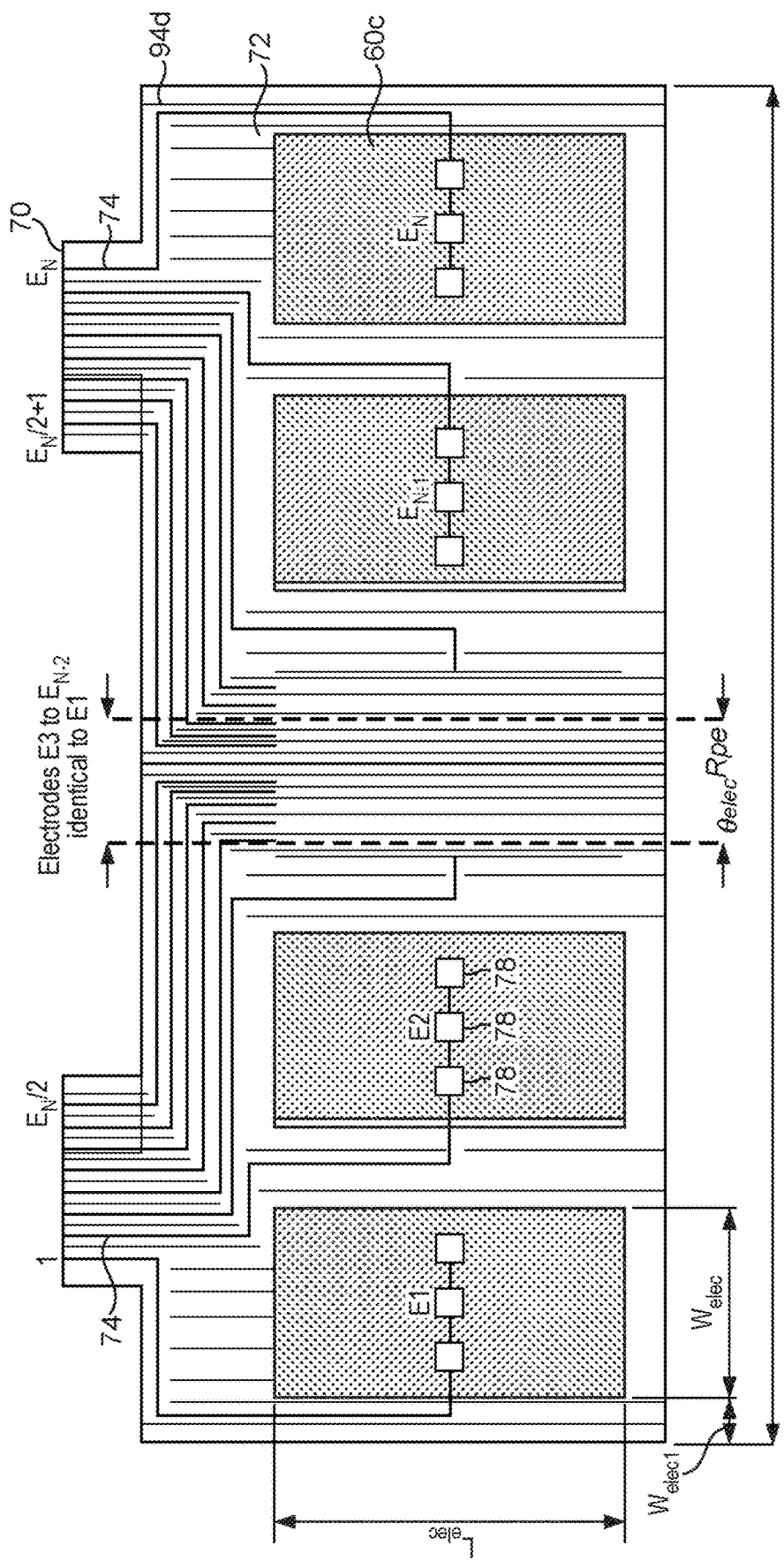

As shown in detail in FIG. 9, the printed circuit board 25 further comprises a second lamina 70 adjacent to the first lamina 31. The second lamina 70 is coextensive with the first lamina 31 and therefore has a portion which peripherally surrounds the measurement electrodes 12. The second lamina 70 comprises a second layer 72 of electrically insulating material. A plurality of electrical connector tracks 74 extend across the second layer 72 of electrically insulating material. The electrical connector tracks 74 electrically connect individual measurement electrodes 12 to at least one connector element 176 on the printed circuit board 25. Each connector element 176 is electrically connected to the signal processing circuitry 43. Each electrical connector track 74 extends over a rear surface 76 of a respective measurement electrode 12 and is electrically connected to the rear surface 76 by at least one connection pad 78. In the illustrated embodiment, the electrical connector track 74 is electrically connected to the respective measurement electrode 12 by a series of three solder connection pads 78. The electrical connector tracks 74 are routed along the spacing between the adjacent measurement electrodes 12 to the connector element 176. The location of the connections pads 78 is also shown in FIG. 8, although the pads 78 themselves are not shown in FIG. 8. The pads 78 are positioned behind the electrode 12 and the exposed outer surface of the electrode 12 is smooth as shown in FIG. 6.

The second lamina 70 further comprises a second array of electrically conductive vias 80 (shown highly schematically by dots representing the vias in FIG. 7) in the second layer 72 of electrically insulating material. The electrically conductive vias 80 electrically connect the second lamina 70 to a reference potential, for example a ground potential (GND). The electrical connector tracks 74 are electrically separated from the reference potential areas formed by the electrically conductive vias 80.

In the illustrated embodiment, guard electrodes 60a, 60b are provided in the first lamina 31 as described above and an additional guard electrode 60c is provided in the second lamina 70 behind each respective measurement electrode 12 and behind respective guard electrodes 60a, 60b. The additional guard electrode 60c covers the rear surface of the measurement electrode 12 and extends beyond the opposite end edges of the measurement electrode 12, for example to have a length equal to the total length of the combination of the measurement electrode 12 and the opposed pair of guard electrodes 60 provided in the first lamina 31 as described above.

The guard electrodes 60a, 60b, 60c are preferably driven at a potential which always closely matches the temporally varying potential at the measurement electrode 12 lying directly underneath. The purpose of this additional guard electrode 60c is to further minimize the effects of stray capacitances leading from that side of the measurement electrode 12 which faces away from the process fluids. The additional guard electrode 60c otherwise has the same structure as the opposed pair of guard electrodes 60 provided in the first lamina 31.

In an alternative non-illustrated embodiment, no guard electrodes 60 are provided in the first lamina 31 as described above. Instead, a single additional guard electrode 60c is provided in the second lamina 70 behind each respective measurement electrode 12 as described above.

Figure 10:
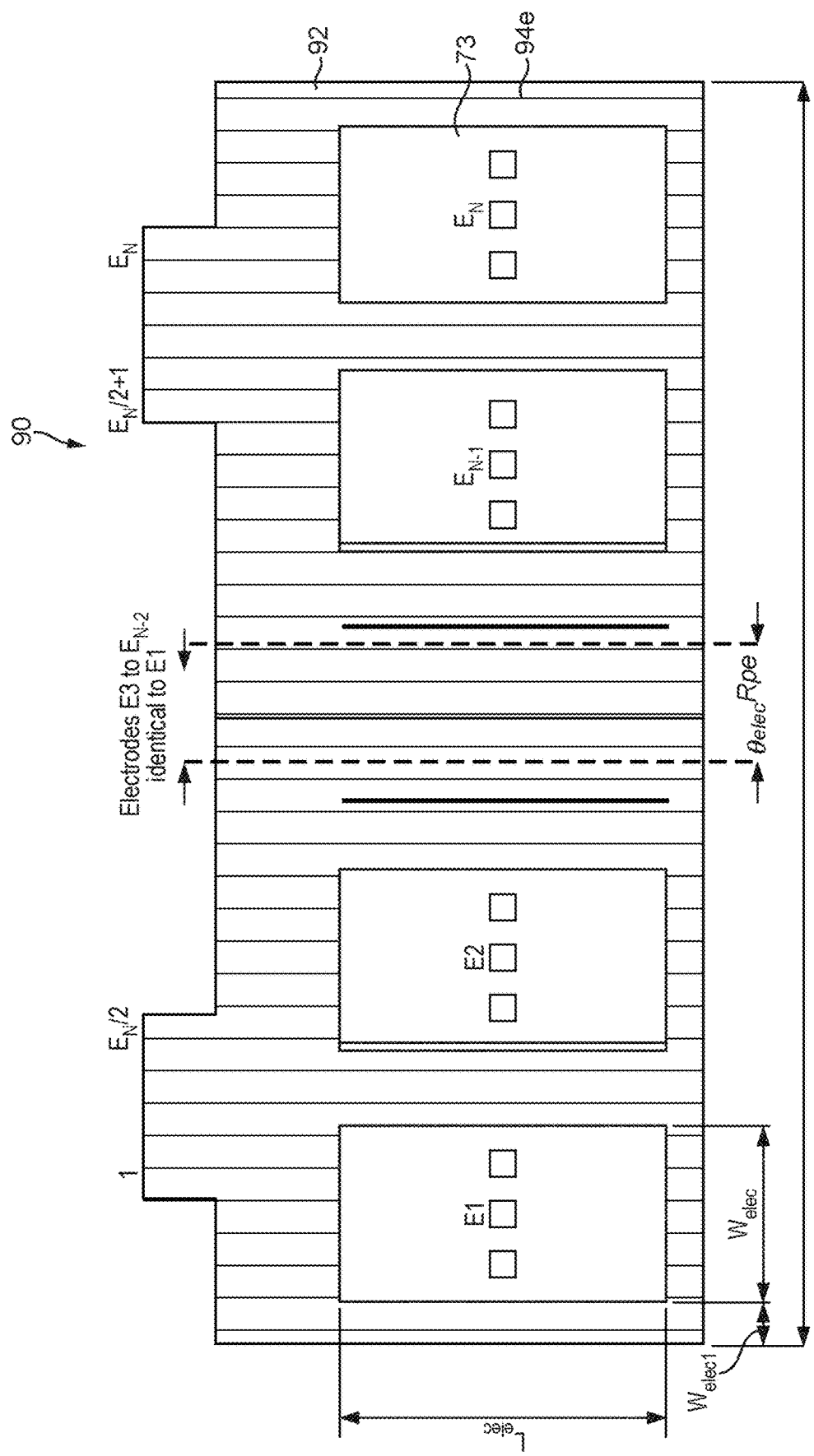

In the illustrated embodiment, the second lamina 70 also peripherally surrounds the guard electrodes 60a, 60b when these are present in the first lamina 31. As shown in detail in FIG. 10, the printed circuit board 25 further comprises a third lamina 90 adjacent to the second lamina 70. FIG. 10 shows the position of the measurement electrodes 12 and the guard electrodes 60 in the first and second laminae 31, 70, and the exposed electrode area 73 is shown. Accordingly, the printed circuit board 25 has a multilaminar constructions, comprising the first and third laminae 31, 90 as outer laminae which sandwich the seconds lamina 70 therebetween as a middle lamina.

As for the second lamina 70, the third lamina 90 is coextensive with the first lamina 31 and therefore has a portion which peripherally surrounds the measurement electrodes 12. The third lamina 90 also peripherally surrounds the guard electrodes 60. The third lamina 90 comprises a third layer 92 of electrically insulating material covering the electrical connector tracks 74 in the second layer 72 of electrically insulating material.

The third lamina 90 further comprises a third array of electrically conductive vias 88 (shown highly schematically by dots representing the vias in FIG. 7) in the third layer 92 of electrically insulating material for electrically connecting the third lamina 90 to a reference potential, for example a ground potential (GND).

In the illustrated embodiment, each measurement electrode 12, each guard electrode 60, each separation area 64, the second layer 72 of electrically insulating material, and the third layer 92 of electrically insulating material comprises at least one channel 94 extending at least partly therethrough for reducing the induction of eddy currents in the respective measurement electrode 12, guard electrode 60, separation area 64, second layer 72 of electrically insulating material and third layer 92 of electrically insulating material by the composite magnetic fields. In the Figures, each measurement electrode 12 has channels 94a, each guard electrode 60 has channels 94b, the first layer 66 of electrically insulating material and each separation area 64 therein has channels 94c, the second layer 72 of electrically insulating material has channels 94d, and the third layer 92 of electrically insulating material has channels 94e. The channel 94 may be open, i.e. unfilled, or filled with an electrically insulating material. In the illustrated embodiment, each of these elements is provided with the eddy current-reducing channels 94, but in alternative embodiments any one, or any combination, of these elements may be provided with the eddy current-reducing channels 94.

Accordingly, each measurement electrode 12 and each guard electrode 60, although comprising a continuous, electrically conducting surface, preferably also comprises narrow, isolated, insulating channels 94 which minimize the effects of eddy currents induced by the fluctuating magnetic field.

The separation area 64, the second layer 72 of electrically insulating material, and the third layer 92 of electrically insulating material are comprised of insulating material which is electrically non-conductive but in addition has electrically conductive vias 68, 80, 88 for electrically connecting the respective separation area 64 second layer 72 of electrically insulating material and third layer 92 of electrically insulating material to a reference potential, for example a ground potential (GND). Accordingly, the provision in these layers of narrow, isolated, insulating channels 94 minimize the effects of eddy currents induced by the fluctuating magnetic field.

The separation area 64, the second layer 72 of electrically insulating material, and the third layer 92 of electrically insulating material are all electrically connected to the respective a reference potential, for example they are earthed at a ground potential (GND), which is a common potential. This provides an electrical and thermal linking between the three laminae 31, 70, 90 of the printed circuit board 25 to prevent ground loops and to ensure effective heat distribution by the printed circuit board 25. The measurement electrodes 12, guard electrodes 60 and electrical connector tracks 74 are electrically separated from the reference potential areas, i.e. the earthed areas.

In the preferred embodiments of the present invention, bias/discharge resistors (not shown) are electrically connected between the measurement electrodes 12 and signal ground to prevent the build-up of static electrical charges in the measurement electrodes 12. The main purpose of the bias/discharge resistances is to provide a return path to ground for the bias currents of the operational amplifiers, described hereinbelow. If bias resistors are not used, the build-up of charge on the electrodes 12 can eventually cause the electrode voltage to saturate. This is particularly relevant in the case of non-contacting electrodes 12 because there is no return path to ground available through the conducting flow fluid, because the electrodes 12 are electrically isolated from the fluid.

Preferably, the annular serial array 35 of mutually spaced measurement electrodes 12 covers a total circumferential distance which is at least 70% of the external circumference of the pipe 4. The guard electrodes 60 correspondingly cover the same total circumferential distance.

Each measurement electrode 12 has a width $w_{elec}$, oriented orthogonally to the longitudinal direction parallel to the flow direction of the flow conduit 6. Preferably, the width $w_{elec}$ is defined by the equation $0.70\theta_{elec} R_{pe} < w_{elec} < 0.90\theta_{elec} R_{pe}$, where $$\theta_{elec} = \frac{2\pi}{N_e},$$

in which $N_e$ is the total number of measurement electrodes 12 in the annular serial array 35 of mutually spaced measurement electrodes 12, and $R_{pe}$ is the radius of the annular serial array 35 at the location of the measurement electrodes 12 on the external surface of, or embedded in, the pipe 4.

Preferably, the measurement electrodes 12 are mutually separated by a separation distance $w_{elec,1}$, oriented orthogonally to the longitudinal direction parallel to the flow direction of the flow conduit 6, which is defined by the equation $0.10\theta_{elec} R_{pe} < w_{elec,1} < 0.30\theta_{elec} R_{pe}$.

Preferably, the combination of each measurement electrode 12 and the pair of guard electrodes 60a, 60b on opposite sides thereof has a total length l elec, oriented along the longitudinal direction parallel to the flow direction of the flow conduit 6, which is defined by the equation $l_{elec} > 2 R_{pe}$, where $R_{pe}$ is the radius of the annular serial array 35 at the location of the measurement electrodes 12 on the external surface of, or embedded in, the pipe 4.

Preferably, the measurement electrode 12 has a length $l_{meas}$, oriented along the longitudinal direction parallel to the flow direction of the flow conduit 6, which is defined by the equation $l_{meas} > 0.30 l_{elec}$.

In order to minimize the end fringing effect and to maximize the electrode area, and the pipe wall capacitance Cw, preferably the effective length $l_{guard}$ of the guard electrode is less than, or equal to, the length $l_{meas}$, of the measurement electrode 12.

As shown in FIG. 1, the plurality of measurement electrodes 12 are electrically connected to the signal processing circuitry 43 by at least one shielded electrical cable 95 which comprises a shield layer 96 surrounding a plurality of electrically conductive wires 97. The shield layer 96 is configured to provide shielding against an electrical field. The apparatus further comprises a shield voltage applying circuit 98 which is configured to apply a shield voltage to the shield layer 96. The effect of the parasitic capacitance and resistance of the signal cable 95 can be minimized by shielding of the cable. An actively driven shield ensures that the voltage in the shield follows the signal at the input of the signal processing circuitry 43 and would thus ensure the difference in voltage between the input and the cable shield is close to zero The signal processing circuitry 43 is configured to (i) detect and accurately measure the small amplitude of the EVT flow induced voltage signals without introducing measurement errors, (ii) effectively reject any noise interference signal coupled to the flow signal and (iii) be unaffected by signal cable parasitic impedance. Since the non-contact measurement electrode 12 directly connects to the signal processing circuitry 43 via a signal cable, which is liable to introduce shunt parasitic impedance and act as noise antenna, the implementation of the front-end of the signal processing circuitry 43 is important to the overall measurement efficiency of non-contact electrode EVT apparatus.

Referring additionally to FIG. 11, the signal processing circuitry 43 comprises a plurality of positive feedback bootstrapped buffer amplifier circuits 100 which are used to achieve a unity gain and ultra-high input impedance for the front-end circuit in contact with the non-contact measurement electrodes 12.

Each of the bootstrapped buffer amplifier circuits 100 has a respective input 102 electrically connected to a respective measurement electrode 12 for receiving a respective flow induced voltage signal from the respective measurement electrode 12.

The bootstrapped buffer amplifier circuit 100 comprises an operational amplifier 104 having a non-inverting input 106, an inverting input 108 and an output 110. An input line 112 electrically connects the respective measurement electrode 12 to the non-inverting input 106. A positive feedback line 114 electrically connects the output 110 to the inverting input 108.

A voltage divider network 116 comprises a first line 118 which electrically connects, at a connection 124, the output 110 to a second line 120 interconnecting the input line 112 and a reference potential, for example a ground potential (GND). The output 110 connects to the first line and negative feedback line 114 at a connection 125. The first line 118 comprises a first resistance $R_{b3}$, and the second line 120 comprises a second resistance $R_{b2}$ which is located between the reference potential and the connection 124 between the first and second lines 118, 120. The first resistance $R_{b3}$ and the second resistance $R_{b2}$ are selected such that $R_{b2} > 100 R_{b3}$, and preferably $R_{b2} > 1000 R_{b3}$. A third resistance $R_x$, which is the input bias current discharge resistance, is located between the input line 112 and the connection 124. Rx is selected to be as high as possible, but not so high that it introduces significant thermal noise.

The output 110 of the operational amplifier 104 is supplied as a positive feedback to the non-inverting input 106 via the voltage divider network 116 where $R_{b2}$ and $R_{b3}$ are the bootstrapped resistances and $R_{b2} >> R_{b3}$. The input impedance $Z_{in,b}$ of the bootstrapped buffer amplifier circuit 100 is defined by $$Z_{in,b} = Z_{in}\left(\frac{R_{b2} + R_{b3}}{R_{b3}}\right) \qquad (6)$$

where $Z_{in}$ is the input impedance without the bootstrapped buffer amplifier circuit 100 and $Z_{in} >> R_x$ and where $R_x$ is the input bias current discharge resistance.

For the purpose of illustration, one embodiment uses the following parameters $Z_{in}$=100 GΩ, $R_{b2}$=10 kΩ, $R_{b3}$=10Ω, and from equation (6) the input impedance $Z_{in,b}$ of the bootstrapped buffer amplifier circuit 100 would be equivalent to $Z_{in}$ increased by a factor 1000. Furthermore, if the pipe wall impedance is 2 GΩ and the amplitude of the EVT voltage generated at the inner pipe wall boundary is given as 20 µV, then the loading error at the input of the positive feedback bootstrapped buffer circuit 100 would be as low as 0.002%.

In the illustrated embodiment, the output 110 of each bootstrapped buffer amplifier circuit 100 is preferably electrically connected to a filter circuit 126 configured to filter high frequency and direct current noise from the amplified flow induced voltage signal. The filter circuit 126 is configured to output an output voltage signal having a substantially flat output and a linear phase response across a preset frequency range. Preferably, the gain and phase response of the filter circuit 126 are selected to satisfy at least the following criteria: (i) a maximum passband flatness, (ii) a 'very sharp' passband-to-stopband transition, and (iii) a slowly varying phase response within the frequency range of the EVT signals.

The signal processing circuitry 43 further comprises a multiplexer circuit 128 which comprises a plurality of inputs 130. Each input 130 is arranged to receive a respective amplified, and optionally filtered, flow induced voltage signal from a respective measurement electrode 12.

The multiplexer circuit 128 is configured, based on a timing signal input at a timing input 132 of the multiplexer circuit 128, sequentially to select flow induced voltage signals to be output at an output 134 of the multiplexer circuit 128 as a reference voltage of a selected reference electrode of the measurements electrodes 12.

As described above, typically one of the measurement electrodes 12 is taken as a reference electrode. One of the measurement electrodes 12 may be selected as the constant reference electrode 12, but alternatively the selection of a reference electrode 12 may vary sequentially among the measurement electrodes 12 so that individual measurement electrodes 12 are utilized, in turn, as the reference electrode 12. In use, the voltages at the electrodes, which are generated as a result of electromagnetically induction between the magnetic field and the fluid, are measured, with respect to the voltage at the set reference electrode, to provide flow induced voltage signals.

For a $N_e$-electrode EVT apparatus where $N_e$ is the total number of measurement electrodes 12, for example sixteen measurement electrodes 12 as shown in FIG. 1, a $N_e$x1 multiplexer circuit 128 is provided to sequentially select a reference measurement electrode 12 from the array of $N_e$ electrodes 12. In the embodiment of FIG. 1, the electrode selection typically starts at electrode e1 moving in a clockwise sequence to electrode e16, but any other sequence may be employed.

The use of a multiple reference electrode configuration, as compared to the use of a fixed reference electrode, provides a number of advantages, for example: (i) to increase in the total number of independent flow induced voltage measurements M (used to compute velocity profile of the conductive phase) obtainable from one complete measurement cycle of the non-contact EVT apparatus from $N_e$ to $$M = \frac{N_e(N_e - 1)}{2} \quad (7)$$

(ii) to remove any restriction related to meter orientation when mounted horizontally; (iii) to improve the robustness of the apparatus device as accurate measurement of the velocity can be achieved using fewer than $N_e$ electrodes; and (iv) to achieve a zero drift correction using measurement from the reference electrode.

The output signal at the output 134 is processed by a processing circuit 136 to calculate a velocity of an electrically conductive phase in the flow conduit 6. In particular, in the illustrated embodiment, the output 134 of the multiplexer circuit 128 is connected to an amplifier circuit 140. The amplifier circuit 140 comprises a plurality of output instrumentation amplifiers 142. Each output instrumentation amplifier 142 has a non-inverting amplifier input 144 electrically connected to a respective input 130 of the multiplexer circuit 128, an inverting amplifier input 146 electrically connected to the output 134 of the multiplexer circuit 128 and an amplifier output 138. The amplifier circuit 140 makes differential measurements between a flow induced voltage signal from the selected reference and other measurement electrodes 12. Each instrumentation amplifier has a high circuit common mode rejection ratio (CMRR). As known to those skilled in the art, common mode rejection characteristics are typically specified in the data sheet for the particular instrumentation amplifier being used.

Various other embodiments of the monitoring apparatus and method of the present invention within the scope of the appended claims will readily be apparent to those skilled in the art.

The invention claimed is:

1. An apparatus for monitoring a fluid flow in a pipe using electromagnetic velocity tomography (EVT), the apparatus comprising a pipe defining a flow conduit, a coil system comprising electrically conductive wires located externally of the flow conduit for generating composite magnetic fields within the flow conduit, a magnetic signal driving circuitry electrically connected to the coil system which is arranged to pass electrical current through the coil system thereby to transmit a magnetic field from the coil system into the flow conduit, a plurality of measurement electrodes located around the flow conduit for detecting voltages induced in an electrically conducting fluid flowing thorough the magnetic field, and a signal processing circuitry electrically connected to the plurality of measurement electrodes for receiving flow induced voltage signals from the electrodes, wherein the plurality of measurement electrodes is comprised in a flexible printed circuit board which is positioned circumferentially around the pipe, the printed circuit board comprising a first lamina, the first lamina comprising an electrically conductive layer which is patterned to form an annular serial array of mutually spaced measurement electrodes around the pipe which are separated from the flow conduit by at least a portion of a thickness of the pipe, wherein the pipe is comprised of an electrically non-conductive material whereby when, in use, an electrically conductive fluid is present in the flow conduit, each measurement electrode and a respective areal portion of the pipe thereunder, form, together with the electrically conductive fluid, a respective sensor which is capacitively coupled to a portion of the electrically conductive fluid in the fluid conduit.

2. An apparatus according to claim 1 wherein each measurement electrode comprises a respective area of the electrically conductive layer.

3. An apparatus according to claim 1 wherein the electrically conductive layer of the printed circuit board is further patterned to form a plurality of guard electrodes, wherein each measurement electrode has opposite first and second edges which are separated in a longitudinal direction which is parallel to a flow direction of the flow conduit, and each electrode is positioned between a respective pair of guard electrodes, each guard electrode of the pair being positioned adjacent to, but electrically separated from, a respective first or second edge of the respective measurement electrode, wherein the guard electrodes are electrically connected to a guard voltage supply system for applying a guard voltage to the guard electrodes.

4. An apparatus according to claim 1 wherein each measurement electrode is rectangular in plan and arcuate in cross-section.

5. An apparatus according to claim 1 wherein the measurement electrodes are separated by separation areas of the first lamina, wherein the separation areas comprise a first layer of electrically insulating material adjacent to the electrically conductive layer, and a first array of electrically conductive vias in the first layer of electrically insulating material for electrically connecting the separation areas to a ground potential.

6. An apparatus according to claim 5 wherein in the first array of electrically conductive vias a plurality of the electrically conductive vias are parallel and mutually spaced, and extend uniformly over the first layer of electrically insulating material.

7. An apparatus according to claim 1 wherein the first lamina is a lower layer of the printed circuit board and is adjacent to an outer circumferential surface of the pipe.

8. An apparatus according to claim 1 wherein the printed circuit board further comprises a second lamina adjacent to the first lamina, wherein the second lamina peripherally surrounds the measurement electrodes, the second lamina comprising a second layer of electrically insulating material and a plurality of electrical connector tracks extending across the second layer of electrically insulating material, wherein the electrical connector tracks electrically connect individual measurement electrodes to at least one connector element on the printed circuit board, the at least one connector element being electrically connected to the signal processing circuitry.

9. An apparatus according to claim 8 wherein each electrical connector track extends over a rear surface of a respective measurement electrode and is electrically connected to the rear surface of the respective measurement electrode by at least one connection pad.

10. An apparatus according to claim 8 wherein the second lamina further comprises a second array of electrically conductive vias in the second layer of electrically insulating material for electrically connecting the second lamina to a ground potential.

11. An apparatus according to claim 8 wherein the electrically conductive layer of the printed circuit board is further patterned to form a plurality of guard electrodes, wherein each measurement electrode has opposite first and second edges which are separated in a longitudinal direction which is parallel to a flow direction of the flow conduit, and each electrode is positioned between a respective pair of guard electrodes, each guard electrode of the pair being positioned adjacent to, but electrically separated from, a respective first or second edge of the respective measurement electrode, wherein the guard electrodes are electrically connected to a guard voltage supply system for applying a guard voltage to the guard electrodes, and wherein the second lamina peripherally surrounds the guard electrodes.

12. An apparatus according to claim 8 wherein the second lamina further comprises a second electrically conductive layer which forms a second guard electrode behind each respective measurement electrode, wherein the second guard electrode covers the rear surface of the respective measurement electrode and extends beyond the first and second edges of the measurement electrode which are separated in a longitudinal direction which is parallel to a flow direction of the flow conduit, wherein the second guard electrodes are electrically connected to a guard voltage supply system for applying a guard voltage to the second guard electrodes.

13. An apparatus according to claim 8 wherein the printed circuit board further comprises a third lamina adjacent to the second lamina, wherein the third lamina peripherally surrounds the measurement electrodes, the third lamina comprising a third layer of electrically insulating material covering the electrical connector tracks in the second layer of electrically insulating material.

14. An apparatus according to claim 13 wherein the third lamina further comprises a third array of electrically conductive vias in the third layer of electrically insulating material for electrically connecting the third lamina to a ground potential.

15. An apparatus according to claim 1 wherein each measurement electrode comprises at least one channel extending at least partly therethrough for reducing the induction of eddy currents in the respective measurement electrode by the composite magnetic fields, wherein the channel is open or filled with an electrically insulating material.

16. An apparatus according to claim 1 wherein the pipe comprises a tubular body and a tubular inner liner affixed to an inner tubular surface of the tubular body, wherein the inner liner increases the electrical capacitance of a region of the pipe between the fluid conduit and the electrode, wherein the electrode is embedded within the tubular body or between the inner liner and the tubular body.

17. An apparatus according to claim 1 wherein the annular serial array of mutually spaced measurement electrodes covers a total circumferential distance which is at least 70% of the circumference of the pipe.

18. An apparatus according to claim 1 wherein flexible printed circuit board is wrapped around an outer surface of the pipe.

19. An apparatus according to claim 1 wherein flexible printed circuit board is embedded within an annular wall of the pipe.

20. An apparatus according to claim 1 wherein each measurement electrode has a width $w_{elec}$, oriented orthogonally to the longitudinal direction parallel to the flow direction of the flow conduit, which is defined by the equation $0.70\theta_{elec} R_{pe} < w_{elec} < 0.90\theta_{elec} R_{pe}$, where $$\theta_{elec} = \frac{2\pi}{N_e},$$

in which $N_e$ is the total number of measurement electrodes in the annular serial array of mutually spaced measurement electrodes, and $R_{pe}$ is the radius of the annular serial array at the location of the measurement electrodes on the external surface of, or embedded in, the pipe, and wherein the measurement electrodes are mutually separated by a separation distance were, oriented orthogonally to the longitudinal direction parallel to the flow direction of the flow conduit, which is defined by the equation $0.10\theta_{elec} R_{pe} < w_{elec,1} < 0.30\theta_{elec} R_{pe}$.

21. An apparatus according to claim 1 wherein the electrically conductive layer of the printed circuit board is further patterned to form a plurality of guard electrodes, wherein each measurement electrode has opposite first and second edges which are separated in a longitudinal direction which is parallel to a flow direction of the flow conduit, and each electrode is positioned between a respective pair of guard electrodes, each guard electrode of the pair being positioned adjacent to, but electrically separated from, a respective first or second edge of the respective measurement electrode, wherein the guard electrodes are electrically connected to a guard voltage supply system for applying a guard voltage to the guard electrodes, and wherein the combination of each measurement electrode and the pair of guard electrodes on opposite sides thereof has a total length $l_{elec}$, oriented along the longitudinal direction parallel to the flow direction of the flow conduit, which is defined by the equation $l_{elec} > 2R_{pe}$, where $R_{pe}$ is the radius of the annular serial array at the location of the measurement electrodes on the external surface of, or embedded in, the pipe, and wherein the measurement electrode has a length $l_{meas}$ oriented along the longitudinal direction parallel to the flow direction of the flow conduit, which is defined by the equation $l_{meas} > 0.30 l_{elec}$.

22. An apparatus according to claim 1 wherein the plurality of measurement electrodes are electrically connected to the signal processing circuitry by at least one shielded electrical cable which comprises a shield layer surrounding a plurality of electrically conductive wires, the shield layer being configured to provide shielding against an electrical field, and the apparatus further comprises a shield voltage applying circuit which is configured to apply a shield voltage to the shield layer.

23. An apparatus according to claim 1 wherein the signal processing circuitry comprises a plurality of bootstrapped buffer amplifier circuits, each of which bootstrapped buffer amplifier circuits has a respective input electrically connected to a respective measurement electrode for receiving a respective flow induced voltage signal from the respective measurement electrode.

24. An apparatus according to claim 23 wherein the bootstrapped buffer amplifier circuit comprises an operational amplifier having a non-inverting input, an inverting input and an output, wherein an input line electrically connects the respective measurement electrode to the non-inverting input, and a positive feedback line electrically connects the output to the inverting input, and a voltage divider network comprises a first line which electrically connects the output to a second line interconnecting the input line and a reference potential.

25. An apparatus according to claim 24 wherein the first line comprises a first resistance $R_{b3}$, and the second line comprises a second resistance $R_{b2}$ which is located between the reference potential and the connection between the first and second lines, wherein $R_{b2} \geq 100 R_{b3}$.

26. An apparatus according to claim 23 wherein the output of each bootstrapped buffer amplifier circuit is electrically connected to a filter circuit configured to filter high frequency and direct current noise from the amplified flow induced voltage signal, wherein the filter circuit is configured to output an output voltage signal having a substantially flat output and a linear phase response across a preset frequency range.

27. An apparatus according to claim 23 wherein the signal processing circuitry further comprises a multiplexer circuit which comprises a plurality of inputs, each input being arranged to receive a respective amplified, and optionally filtered, flow induced voltage signal from a respective measurement electrode, and the multiplexer circuit is configured, based on a timing signal input at a timing input of the multiplexer circuit, sequentially to select flow induced voltage signals to be output at an output of the multiplexer circuit as a reference voltage of a selected reference electrode of the measurements electrodes for processing by a processing circuit to calculate a velocity of an electrically conductive phase in the flow conduit.

28. An apparatus according to claim 27 wherein the output of the multiplexer circuit is connected to an amplifier circuit, the amplifier circuit comprises a plurality of output instrumentation amplifiers, each output instrumentation amplifier having a non-inverting amplifier input electrically connected to a respective input of the multiplexer circuit, an inverting amplifier input electrically connected to the output of the multiplexer circuit and an amplifier output, whereby the amplifier circuit makes differential measurements between a flow induced voltage signal from the selected reference and other measurement electrodes.

29. An apparatus according to claim 28 wherein the two-stage instrumentation amplifier has a high circuit common mode rejection ratio (CMRR).

30. An apparatus according to claim 1 which is arranged to measure the velocity profile of a single phase flow of an electrically conducting fluid in the flow conduit or is arranged to measure the velocity profile of a continuous electrically conducting phase of a multiphase fluid flow in the flow conduit.

* * * * *